United States Patent [19]

Kelley et al.

[11] Patent Number: 5,461,567
[45] Date of Patent: Oct. 24, 1995

[54] SUPPLEMENTAL INFLATABLE RESTRAINT SYSTEM HAVING A REAR IMPACT ALGORITHM FOR SEAT BELT PRETENSIONER

[75] Inventors: Jon P. Kelley; Jiyao Liu, both of Kokomo, Ind.

[73] Assignee: Delco Electronics Corporation, Kokomo, Ind.

[21] Appl. No.: 205,468

[22] Filed: Mar. 4, 1994

[51] Int. Cl.⁶ .......................... B60R 21/16; B60R 21/18; B60R 22/343
[52] U.S. Cl. .................... 364/424.05; 307/10.1; 340/669; 280/735; 180/282
[58] Field of Search ................ 364/424.05; 340/436, 340/669; 280/734, 735; 180/274, 282; 307/10.1

[56] References Cited

U.S. PATENT DOCUMENTS

| | | |
|---|---|---|
| 3,720,426 | 3/1973 | Johnston . |
| 3,835,273 | 9/1974 | Stolarik ................... 200/61.45 |
| 4,381,829 | 5/1983 | Montaron ..................... 180/274 |
| 4,569,534 | 2/1986 | Nalbandyan et al. ............. 180/274 |
| 4,836,024 | 6/1989 | Woehrl et al. ................. 280/735 |
| 5,068,793 | 11/1991 | Condne et al. ................ 364/424.5 |
| 5,129,673 | 7/1992 | Mattes et al. .................. 280/735 |
| 5,157,268 | 10/1992 | Spies et al. .................... 307/10.1 |
| 5,168,494 | 2/1993 | Shimose ........................ 280/806 |
| 5,173,614 | 12/1992 | Woehrl et al. ................. 307/10.1 |
| 5,202,831 | 4/1993 | Blackburn et al. ............. 364/424.5 |
| 5,225,985 | 7/1993 | Okano ......................... 364/424.05 |
| 5,413,378 | 5/1995 | Steffens Jr. et al. ............. 280/725 |

*Primary Examiner*—Kevin J. Teska
*Assistant Examiner*—Tyrone V. Walker
*Attorney, Agent, or Firm*—Mark A. Navarre

[57] ABSTRACT

A system having an accelerometer and a micro-controller responsive to acceleration signals for deploying an air bag as well as activating a pretensioner upon frontal impact includes an algorithm for activating the pretensioner upon rear impact. A frontal crash algorithm is executed when the acceleration exceeds a negative threshold and a rear impact algorithm is enabled when the acceleration exceeds a positive threshold. Rear impact severity is tested by integrating positive acceleration samples and issuing an activation command when the integrated value attains a severity threshold value. Noise immunity results from the positive threshold and from resetting the integrated value to zero whenever a negative acceleration sample intervenes in the severity test.

2 Claims, 1 Drawing Sheet

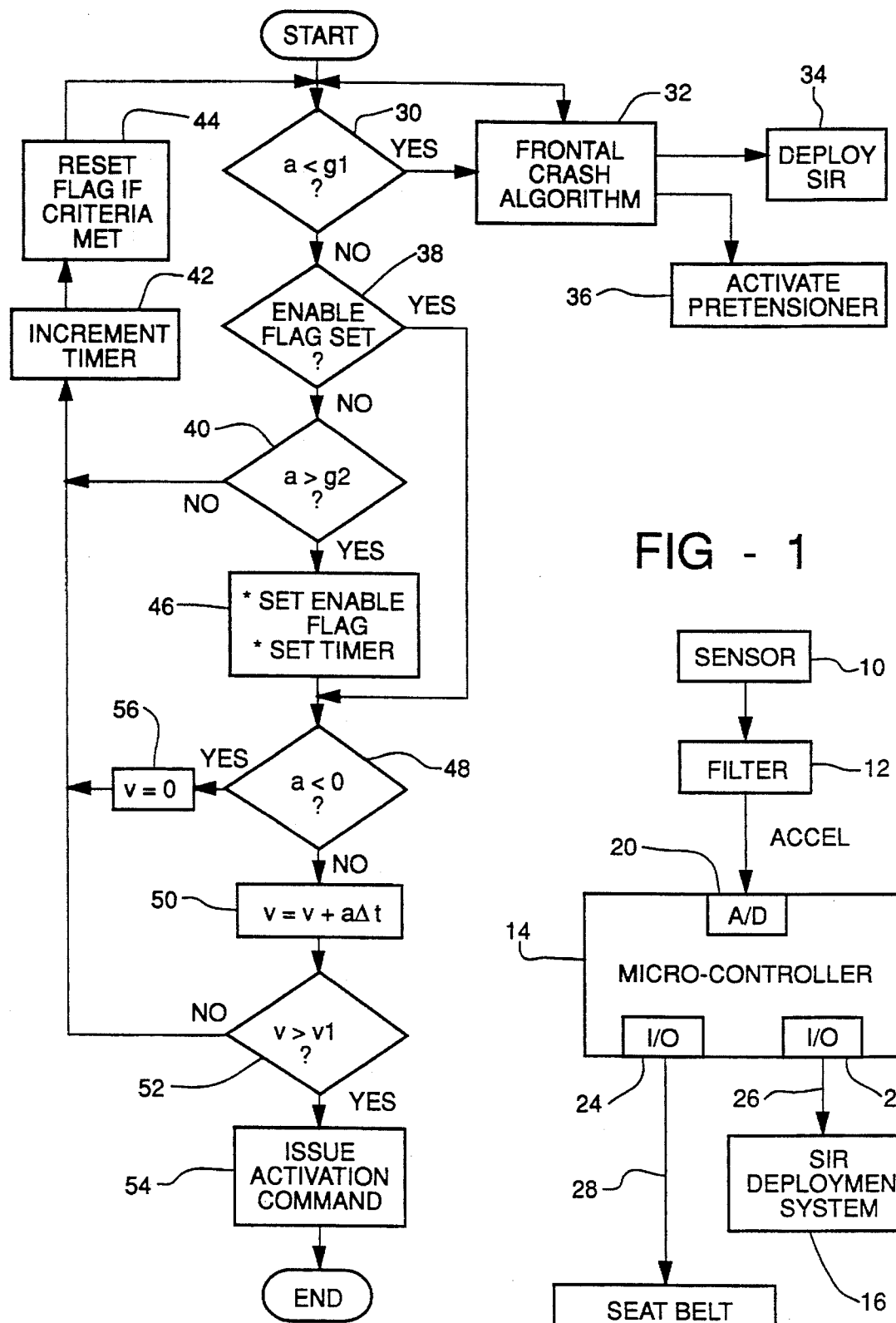

SUPPLEMENTAL INFLATABLE RESTRAINT SYSTEM HAVING A REAR IMPACT ALGORITHM FOR SEAT BELT PRETENSIONER

FIELD OF THE INVENTION

This invention relates to a method of activating seat belt pretensioners in rear impacts and particularly to such a method incorporated in a supplemental inflatable restraint deployment method.

BACKGROUND OF THE INVENTION

Automotive seat belts in conventional usage have employed a spring-loaded retractor for holding the belt against the body of the occupant and normally allowing the belt to be released to permit movement of the occupant. In the case of sudden vehicle deceleration caused by braking or by a frontal impact, for example, an inertial latch secures the retractor to prevent belt feeding to thereby restrain the occupant. When a vehicle is equipped with supplemental inflatable restraints (SIR) a pretensioner is sometimes added to the seat belt. The pretensioner, when activated, provides a force to rapidly retract the seat belt to hold the occupant firmly against the seat back. The activation is provided in response to an electrical command signal when a frontal impact is deemed by the SIR micro-controller to be in progress. The motor for the pretensioner may be, for example, a pyrotechnic charge which is fired by the command signal to reel in the belt. Since the vehicle must be serviced to replace such a device after discharge, it is important that it be fired only when it is highly probable that a severe impact is in progress. Accordingly, the pretensioner is activated at the same time the SIR is deployed or slightly prior to deployment in response to a predetermined level of frontal impact.

It is desirable to extend the application of seat belt pretensioners to occupant protection during a rear impact. When rear impact is sufficiently severe, the occupant initially presses into the seat back and then springs forward, or sometimes forward and upward, to potentially make contact with the steering wheel or dashboard or with the ceiling. It is important that any control for activating the pretensioner upon rear impact does not interfere with its intended operation during a frontal impact, and that other types of impact do not trigger the activation. The other types of impact may be, for example, vibrations due to rough roads, contact of the undercarriage with the road surface or some object on the road, or hammer blows delivered to the vehicle during servicing.

SUMMARY OF THE INVENTION

It is therefore an object of the invention to activate a seat belt pretensioner upon rear impact of sufficient severity to warrant occupant protection measures without impairing the sensitivity or performance of the SIR system in any way. Another object is to allow such activation while assuring immunity of a pretensioner activation to impacts other than frontal or rear impacts. Another object is to activate a pretensioner with minimal impact on SIR micro-controller memory and throughput.

To implement the invention, the rear impact protection is employed in conjunction with an SIR system, using the same micro-controller to determine severity of frontal impact as well as of rear impact, using different algorithms for each.

The SIR system employs an accelerometer to detect change of vehicle velocity due to either front or rear impact. The accelerometer output signal is analyzed by the micro-controller to determine severity of a frontal impact and, when appropriate, to issue commands for activating the seat belt pretensioner and/or deploying the inflatable restraint. The vehicle acceleration needed to effect that result is negative, reducing the vehicle forward velocity. According to this improvement, the micro-controller separately analyzes positive acceleration signals to detect rear impact which tends to increase the forward velocity. When the positive acceleration indicates a severe rear impact the micro-controller commands the pretensioner to activate.

The operation of the frontal and rear impact algorithms inherently are mutually exclusive since one is operative only during substantial positive acceleration and the other is operative during substantial negative acceleration. Thus, while one algorithm is being executed the other is not needed. In the case where a rear impact is immediately followed by a frontal impact, the acceleration changes from positive to negative so that the rear impact algorithm is interrupted and the frontal impact algorithm is invoked. The acceleration zone between the positive and negative acceleration thresholds which enable one algorithm or the other is the region where noise due to rough roads or other causes is exhibited. This zone is, in effect, a dead band which is useful for noise discrimination. Each algorithm, however may make use of additional measures to prevent noise spikes from causing a false activation or deployment.

A number of SIR deployment algorithms are well known. For example, a suitable micro-controller-based severity control is disclosed in the co-pending U.S. patent application Ser. No. 07/797,850, filed Nov. 26, 1991, assigned to General Motors Corporation. The rear impact determination, however, does not depend on use with any particular SIR deployment algorithm since it is expected to be compatible with any such SIR algorithm.

Severe rear impact is recognized by first enabling a severity test and starting a test interval upon receipt of a large positive acceleration sample which is not likely to result from noise, and then accumulating sequential positive acceleration data over the test interval. When the accumulated amount reaches a threshold, the impact is determined to be severe enough to warrant seat belt pretensioning. Since the summation or integration of the acceleration is effectively a measure of velocity, the threshold is conveniently expressed as a velocity value. Experience with the rear impact sensing system reveals that a velocity in the range of 3 to 6 mph is an appropriate threshold. The specific threshold for a given vehicle type is calibrated on the basis of empirical data.

In addition to requiring the large positive acceleration sample, noise immunity depends on the recognition that the spurious vibrations due to rough road, etc., have oscillating acceleration signatures which have both positive and negative spikes and lack a sustained positive acceleration sufficient to accumulate a value reaching the velocity threshold or the average acceleration threshold. To assure that such noise is not interpreted as rear impact, the accumulation of positive acceleration data is interrupted when a zero or negative acceleration is detected and the accumulation is begun again from zero at the next positive acceleration.

Another approach to testing for impact severity during the test interval is to accumulate a predetermined number of acceleration samples and calculate the average acceleration, and to deem the impact to be severe if the average acceleration exceeds a threshold and the acceleration continues to increase.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a block diagram of a controller for a SIR deployment system and a seat belt pretensioner system; and FIG. 2 is a flow chart representing the algorithm for detecting a rear impact and activating a seat belt pretensioner.

DESCRIPTION OF THE INVENTION

FIG. 1 shows a SIR and seat belt pretensioner system comprising an accelerometer 10, a hardware low-pass filter 12, a micro-controller 14, a SIR deployment system 16 and a seat belt pretensioner system 18. The elements 10–18 may be generally conventional, except for the functionality of the micro-controller 14 under the direction of the control software described herein. Accelerometer 10 provides an analog electrical signal corresponding to the acceleration, positive or negative, along the longitudinal axis of the vehicle. The acceleration signal is applied to filter 12 to form a filtered acceleration signal ACCEL, which is applied as an input to an A/D input port 20 of micro-controller 14 for analysis according to this invention and further according to previously known SIR methods. In addition to the A/D port 20, micro-controller 14 comprises conventional electronic componentry, including a microprocessor, random-access and read-only memories, and suitable output ports 22 and 24 for respectively issuing a deployment command to the deployment system 16 or an activation command to the pretensioner system 18 when warranted by the acceleration signal analysis. Upon receipt of a deployment command on line 26, the deployment system 16 triggers air bag inflation to arrest the displacement of the vehicle occupants. Similarly, upon receipt of an activation command on line 28, the seat belt pretensioner system 18 activates the pretensioner to tighten the seat belt sufficiently to secure the occupants in place against the seat backs. In the case of a frontal impact the resulting negative acceleration signal may result in energizing both the SIR and the pretensioner system which act in concert to optimize occupant safety. On the other hand, in a rear impact the corresponding positive acceleration signal will activate only the pretensioner to prevent the occupants from being thrown forward as a secondary response to the impact.

The control method of the invention is implemented by control software resident within the micro-controller 14 for timely issuing an activation command to the pretensioner system in the event of a rear impact along with known software for issuing a deployment command to the deployment system in the event of a frontal crash. The micro-controller processes the software loop periodically, say at a rate of 1600 to 2000 Hz, to repeatedly sample the acceleration signal. If in block 30 it is determined that the acceleration "a" is less (more negative) than a threshold g1 (which may be −2 to −5 g's) a frontal crash algorithm in block 32 is executed, returning to block 30 in each loop. If block 32 determines that a frontal crash is sufficiently severe the SIR is deployed and/or the pretensioner is activated via blocks 34 and 36. When the condition of block 30 is not met, and an ENABLE flag is not set (block 38), the acceleration "a" is compared to another threshold g2 which is a positive value sufficient to indicate that a rear impact has been initiated. This value is selected empirically for each type of vehicle platform and may range, for example, from 1 to 2.5 g's. In block 40, if "a" is not greater than g2 the loop control returns to Start, incrementing a timer at block 42 and causing a determination in block 44 of whether flag reset criteria are met. On the other hand, if "a" is greater than g2, an ENABLE flag is set by block 46 and at the same time the timer is set to zero to begin a test interval for rear impact severity. During that interval, the blocks 40 and 46 are bypassed in each loop.

To evaluate the severity of the rear impact, the acceleration "a" is first tested for sign in block 48. If the acceleration "a" is not negative it is integrated in block 50 by adding each acceleration value to the sum of previously received acceleration values to obtain a velocity value "v" which is a measure of rear impact severity. If, in block 52 the value "v" proves to be greater than a threshold v1, a pretensioner activation command is issued (block 54) which causes the pretensioner to be discharged to snug up the seat belts. Then the control loop is ended.

When block 48 detects that an acceleration sample is negative, the velocity "v" is reset to zero in block 56. This provides noise immunity by preventing substantial contribution to velocity "v" due to the oscillating acceleration signals arising from spurious noise sources such as rough roads. This feature, along with the threshold g2 test in block 40, prevents the triggering of the pretensioner by noise. After block 56 sets the velocity to zero or when the threshold v1 is not met in block 52 the loop returns to Start, incrementing the timer and the consideration of reset conditions.

The reset criteria in block 44 are selected to end the severity test interval when it is likely that there is no severe rear impact. Such criteria are similar to reset criteria often used in frontal crash algorithms. For example, Reset is commanded if a predetermined time since enablement has expired and the acceleration is small. The time interval is empirically determined and may be on the order of 100 ms. A severe rear impact will cause the severity threshold v1 to be attained within this interval. If, however, the acceleration is sufficiently large to indicate a rear impact is still in progress, the Reset is withheld after time expiration until the acceleration becomes close to zero.

As indicated above, another impact severity test which could be used during the severity test interval is to calculate average acceleration in a time window, say, 8 ms, and to activate the pretensioner if the average acceleration reaches a threshold and if the acceleration value continues to rise after the threshold is reached. The combination of the high average acceleration and the continuing increase of acceleration rule out activation by noise signals.

The embodiments of the invention in which an exclusive property or privilege is claimed are defined as follows:

1. In an automotive vehicle having a supplemental inflatable restraint (SIR) for deployment upon a frontal impact and seat belts for occupant restraint and a seat belt pretensioner for applying tension in response to an activation signal, an acceleration sensor responsive to longitudinal acceleration wherein frontal and rear impacts produce negative and positive acceleration respectively, a method of operation comprising the steps of:

sensing vehicle acceleration and generating an acceleration signal;

repeatedly sampling the acceleration signal;

enabling a rear impact algorithm for determining severity of rear impact when an acceleration sample exceeds a positive acceleration threshold, the rear impact algorithm operating to determine a rear impact severity value and to generate said activation signal which initiates seat belt pretensioning when said rear impact severity value exceeds a severity threshold; and disabling said rear impact algorithm and enabling a frontal crash algorithm, irrespective of the status of rear impact algorithm, to control SIR deployment when an acceleration sample exceeds a negative acceleration threshold.

2. The invention as defined in claim 1 including noise discrimination wherein negative acceleration samples occur due to noise comprising:

detecting negative acceleration due to noise after the enabling of the rear impact algorithm, and setting the rear impact severity value to zero when said negative acceleration due to noise is detected.

* * * * *